(12) United States Patent
Edwards et al.

(10) Patent No.: US 11,403,329 B2
(45) Date of Patent: Aug. 2, 2022

(54) ADAPTIVE AND TRANSPARENT ENTITY SCREENING

(71) Applicant: Palantir Technologies Inc., Denver, CO (US)

(72) Inventors: Nathaniel Edwards, Arlington, VA (US); Kyle Owens, San Francisco, CA (US); Nikola Chonkov, New York, NY (US); Sintia Dotel, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/080,610

(22) Filed: Oct. 26, 2020

(65) Prior Publication Data

US 2021/0042333 A1 Feb. 11, 2021

Related U.S. Application Data

(63) Continuation of application No. 15/910,868, filed on Mar. 2, 2018, now Pat. No. 10,838,987.

(60) Provisional application No. 62/608,496, filed on Dec. 20, 2017.

(51) Int. Cl.
*G06F 16/28* (2019.01)
*G06F 16/23* (2019.01)
*G06F 16/2457* (2019.01)
*G06F 16/901* (2019.01)
*G06F 16/25* (2019.01)

(52) U.S. Cl.
CPC ............ *G06F 16/288* (2019.01); *G06F 16/23* (2019.01); *G06F 16/2457* (2019.01); *G06F 16/9024* (2019.01); *G06F 16/25* (2019.01)

(58) Field of Classification Search
None
See application file for complete search history.

(56) References Cited

U.S. PATENT DOCUMENTS

| 9,235,652 B1 * | 1/2016 | Jeffery ................ G06F 16/254 |
| 10,360,238 B1 * | 7/2019 | O'Brien ................ G06F 16/25 |
| 10,838,987 B1 | 11/2020 | Edwards et al. |

(Continued)

OTHER PUBLICATIONS

U.S. Pat. No. 10,838,987, Adaptive and Transparent Entity Screening, Nov. 17, 2020.

*Primary Examiner* — Kim T Nguyen
(74) *Attorney, Agent, or Firm* — Knobbe Martens Olson & Bear, LLP

(57) ABSTRACT

Systems and methods for adaptive and transparent entity screening are provided. In an aspect, a first entity list comprising a plurality of first entity records is accessed. The first entity records comprise a plurality of first entity identifying attributes. A second entity list comprising a plurality of second entity records is also accessed, wherein the second entity records comprise a plurality of second entity identifying attributes. In certain aspects, an entity screening model pairs the first entity identifying attributes of the first entity record with the second entity identifying attributes of the second entity record, executes different matching algorithms on pairs of entity identifying attributes, and determines an overall likelihood that the pair of entity records are a match based on aggregation of match scores from the plurality of matching algorithms.

20 Claims, 9 Drawing Sheets

(56) References Cited

U.S. PATENT DOCUMENTS

| | | | | |
|---|---|---|---|---|
| 2009/0177647 A1* | 7/2009 | Oliver | ................ | G06F 16/2246 |
| | | | | 707/999.005 |
| 2010/0303340 A1* | 12/2010 | Abraham | ................ | G06T 7/593 |
| | | | | 382/154 |
| 2012/0054199 A1* | 3/2012 | Bayliss | ................... | G06F 16/20 |
| | | | | 707/E17.084 |
| 2014/0156753 A1* | 6/2014 | Ben-Efraim | ........... | G06Q 50/01 |
| | | | | 709/204 |
| 2016/0004741 A1* | 1/2016 | Johnson | ................. | G06F 16/23 |
| | | | | 707/783 |
| 2016/0147871 A1* | 5/2016 | Kalyanpur | ........... | G06F 40/205 |
| | | | | 707/728 |
| 2016/0299884 A1* | 10/2016 | Chioasca | ................ | G06F 40/30 |

* cited by examiner

ADAPTIVE AND TRANSPARENT ENTITY SCREENING

TECHNICAL FIELD

The present disclosure relates to systems and techniques for adaptive and transparent entity screening. More specifically, the present disclosure relates to adaptive and transparent entity screening that may be configured to continuously reassess a match between pairs of entities in a way that is easily reviewable by a user.

BACKGROUND

Large data sets may include multiple, separate references for the same entity. Existing entity screening systems may determine whether two references are associated with the same entity and may assign a score to indicate the strength of the match. However, the basis (e.g., rules, logic) for determining a match or assigning a certain score is not typically available to the user. Additionally, the results of entity screening do not adjust for information provided after the initial request is completed, such as updated entity information in one or more of the large data sets. Thus, the technical problems include lack of transparency into the entity screening process and static entity match scoring.

SUMMARY

The systems, methods, and devices described herein each have several aspects, no single one of which is solely responsible for its desirable attributes. Without limiting the scope of this disclosure, several non-limiting features will now be discussed briefly.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

One aspect of the disclosure provides a system for adaptive and transparent entity screening. The system comprises one or more computer processors and a tangible computer readable medium storing software instructions executable by computing system. The software instructions may cause the computing system to access a first entity list comprising a plurality of first entity records, each of the first entity records comprising a plurality of first entity identifying attributes. The software instructions may also cause the computing system to access a second entity list comprising a second plurality of second entity records, each of the second entity records comprising a plurality of second entity identifying attributes. The software instructions may also cause the computing system to access an entity screening model comprising a plurality of matching rules, each of the matching rules indicating at least one of the entity identifying attributes, a match criteria (e.g., algorithm), and/or an attribute match score (or weighting for the particular matching rule). The computing system may also determine pairs of entities and apply matching rules to attributes of the pair of entities to generate an overall pair match score. The software instructions may also cause the computing system to provide a user interface and periodically and automatically determine changes in entity information and generate updates to overall pair match scores to account for changes in information.

DETAILED DESCRIPTION

Overview

Figure 1:
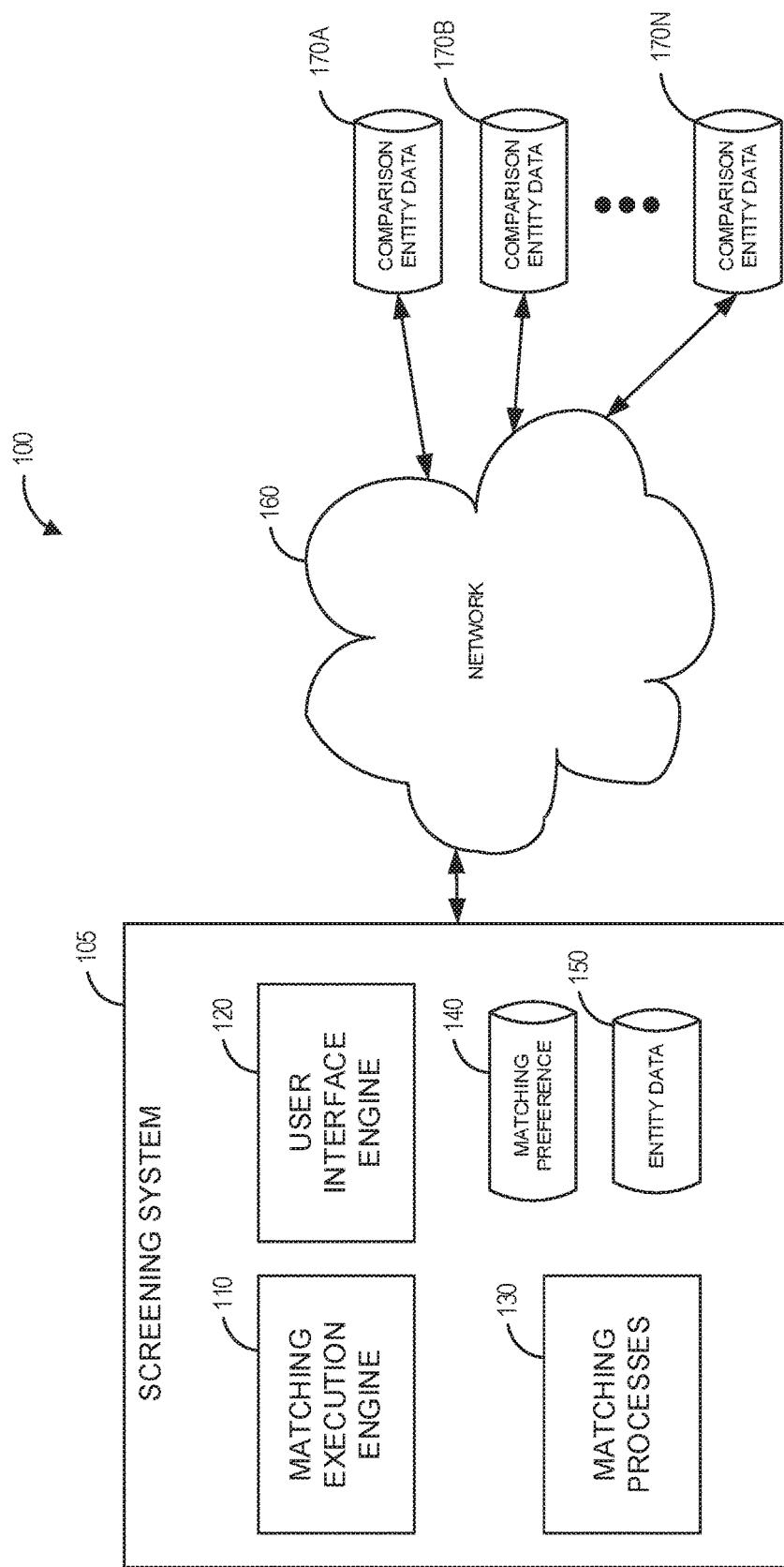
FIG. 1 schematically illustrates an example of an adaptive and transparent entity screening system.

The screening system accesses a first database storing information regarding a plurality of first entities, e.g., a listing of clients, vendors, or other entities, and generates scores indicating similarity of the first entities to entities in a second database, e.g., entities included in a listing of high risk companies.

The system compares pairs of entities, such as a first entity (e.g., a first current or potential client) included in the clients list paired with individual second entities (e.g., high risk companies in a second entity listing entities potentially associated with money laundering). Data attributes of pairs of entities on the two lists are compared through a comparison algorithm. The algorithm may, for example, increase a match score by a weighted amount for each matching attribute of the pair of entities. Thus, the relative importance of matches of different entity attributes may be weighted in determining a match score for each pair of entities (such as by setting attribute or matching process-specific match scores to levels indicating relative importance of the attributes in identifying matching entity pairs).

The degree of matching, such as for particular entity attributes, may be determined by various matching processes, such as an exact match comparison, a matching algorithm determining the number of deletions, insertions, or substitutions required to transform a first string to a second string, a matching algorithm encoding homophones to match strings with similar pronunciations despite minor differences in spelling, or other comparison algorithms. The matching processes may provide separate match scores that each contribute to an overall match score representing the strength of a match between an entity pair. For example, separate matching processes for attributes such as name, address, country, etc., may be performed to determine separate match scores to include in an overall match score. The degree of matching may also be affected by a score modifier representing particular areas of concern (e.g., addresses within a particular set of countries or regions). Score modifiers, which are discussed in further detail below, may not help determine whether two entities are the same, but they may nonetheless increase an overall match score by a static amount to alert the user of a particular area of concern related to the match.

The match scores may be presented to the user through a graphical user interface, such as a sorted list of match scores indicating the entity pairs having the highest overall match scores. The contribution of separate entity attributes or score modifiers in overall match scores may also be displayed to the user. Further, in some embodiments the user may adjust weightings applied to individual entity attributes (or to individual matching processes that may be applied to a same entity identifying attribute, such as a deterministic and a probabilistic matching process), which may be re-applied to the displayed entity match(es) and/or used in later entity matching.

The match algorithm may include multiple processes that are separately executable, such as processes that apply attribute-specific scoring of entities. Attribute-specific scores generated by these separately executable processes may then be combined into an overall match score for display to the user.

The scoring processes may be automatically re-executed on updated entity lists (e.g., that are updated periodically to include changes to entity attributes and/or new entity information) to provide updated match score between entity pairs that reflect changes in entity attributes, such as name, address, country, etc., and creates new comparison pairs when either of the entity lists is updated. This periodic rescoring provides an ongoing risk representation to a user that is interested in continuous monitoring of entities (e.g., current and/or potential clients, vendors, affiliates, employees, contractors, etc.) for inclusion on a listing or directory indicative of an increased (or decreased) risk associated with the entities (e.g., Department of Treasury's Office of Foreign Assets Control consolidated sanctions list).

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Entity: An individual, a group of individuals (e.g., a household of individuals, a married couple, etc.), a business, or other organization.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties (or "Attributes"): information about a data object, such as an entity, that represent the particular data object. Each attribute of a data object has a property type and a value or values. Entity properties, for example, may include name, address, postal code, IP address, username, phone number, etc.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Examples of Adaptive and Transparent Entity Screening

FIG. 1 is a block diagram of an example entity screening environment 100, including an entity screening system 105 in data communication with multiple entity data stores 170. In the example of FIG. 1, the screening system 105 is in communication with one or more comparison entity data sources 170 (including data sources 170A, 170B, 170N, indicating any number of data sources) via a network 160, which could be any combination of communication networks, such as local area networks, wide area networks, and/or the Internet.

The system 100 may utilize comparison entity data stores 170 (e.g., 170A, 170B, and 170N) to conduct adaptive and transparent entity screening, such as against entities with information stored in entity data store 150. The comparison entity data stores 170 may comprise a plurality of entity attributes for each of a plurality of entities. By way of example, data attributes regarding each entity (that may be stored by in one or more of the comparison entity data stores 170) may include attributes such as a name, alternate names, nicknames, an identity code (e.g., government, corporate, or other identification code), mailing and/or home address (e.g., street address, country, zip code), Social Security number, driver's license and other government identification numbers, citizenship, legal status, gender, race/ethnicity, birth date, place of birth, telephone numbers, email addresses, religious preference, security clearance, maiden name, spouse information, marital status, child information, emergency contact information, biometrics, financial information, medical information, disability information, law enforcement information, employment information, educational information, military records, and the like.

The comparison entity data stores 170 may include information relating to entities extracted from one or more other database, list, or collections of entity information. Comparison entity data from the comparison entity data stores 170 may be transmitted over the network 160 and received by the screening system 105, which may store some or all of the entity data (either temporarily or permanently) in the entity data store 150.

In the specific example presented in FIG. 1, the screening system 105 comprises a computer processor that executes software instructions, such as those stored in various software engines or modules. For example, the screening system 105 executes a matching execution engine 110 that coordinates execution of multiple matching processes 130 and a user interface engine 120 that interfaces with a user to receive updated weightings, matching criteria, etc., and provide results of matching processes and notifications of matches to users. These software engines provide various features of the entity screening processes that are discussed herein. In some embodiments, entity screening may be based on matching preferences 140, such as attributes and weightings to be applied for a certain entity screening process, that are applied to entity data 150 and/or comparison entity data accessed at the comparison entity data stores 170.

In the embodiment of FIG. 1, the matching processes 130 may include multiple matching processes that are separately executable to provide various matching functionalities. For example, one matching process 130 may extract data attributes associated with entities from the entity data 150 and/or the comparison entity data 170, while another matching process may determine pairs of entities (e.g., one entity from the entity data 150 and one entity from the comparison entity data 170) to which to apply one or more data attribute matching algorithms. For example, the entity data 150 may contain information about company 1 and comparison entity data 170 includes information regarding company 2. A first matching process 130 may extract data attributes (e.g., name, tax ID code, street address, etc.) of company 1 and company 2 from the respective data stores, and a second matching process 130 may pair company 1 and company 2 for comparison (e.g., along with pairs of other sets of entities) and determined data attributes of the entities for comparison. The matching execution engine 110 may then execute a plurality of matching algorithms, each associated with a particular one or more attributes, on the entity attributes of company 1 and company 2. In some embodiments, the matching execution engine 110 executes another matching process 130 that accumulates (or otherwise combines) results of the several attribute matching algorithms to develop a likelihood indicator (e.g., a score) that company 1 and company 2 are the same entity. For example, the algorithm may generate an overall match score representing the likelihood that company 1 and company 2 are actually the same based on an aggregation of multiple match scores associated with subsets of attributes (such as may be determined by separately executable processes). For example, an overall match score for a pair of entities is higher (by a weighted amount associated with name matches) when a pair of name attributes match (e.g., the name listed for the company 1 and company 2 are identical), such as a first amount if the attributes match exactly (e.g., a deterministic match) or a second lower amount if the attributes have a probabilistic (e.g., non-exact) match. For example, the degree of matching (e.g., between a probabilistic and deterministic match) and the corresponding match weighting may be combined to create an attribute match score (that may be aggregated with other attribute match scores). For example, the probabilistic match outcome of a match scoring algorithm, such as an algorithm determining the number of deletions, insertions, or substitutions required to transform a first string to a second string (e.g., Levenshtein distance or similar) applied to particular attributes of entities (e.g., company names), may result in a wide range of match scores (indicating a wide range of match confidence levels) for that particular attribute. Another probabilistic matching function encodes homophones together so that they can be matched according to similar pronunciations despite minor differences in spelling of strings (e.g., soundex or similar), and may also result in a range of match scores (indicating a range of match confidence levels) when applied to entity pair attributes.

Advantageously, the various matching processes 130 may be selected for execution by the matching execution engine 110, such as based on a schedule or prioritized ordering of execution (or re-execution). For example, a matching process (e.g., a probabilistic match of a large alphanumeric attribute) may require much more time for completion than another matching process (e.g., an exact match of two character attribute) and, thus, may be scheduled for re-execution less frequently.

In some embodiments, the matching execution engine 110 initiates (based on real-time need for matching and/or a predetermined schedule) matching processes 130 so that multiple processes run concurrently. In other embodiments, the matching execution engine 110 may control other aspects of matching processes 130, such as the execution order of the processes in a sequential pipeline or the number of processes to be executed simultaneously at any given time.

The user interface engine 120 interfaces with users (not shown) such as by generating data for interactive graphical user interfaces, such as a user interface displaying results of an adaptive and transparent entity screening process. For example, the graphical user interface may display a list of data attributes from company 1 and company 2 and display an overall match score for the two companies. The weighting of individual data attributes, which may be expressed in an attribute or matching process match score, that contribute to the overall match score may also be displayed to the user. Further, user interface engine 120 may also display user interface controls (e.g., buttons or text entry fields) that allow the user to adjust weightings associated with particular data attributes, which may then be applied to create new overall match scores for existing pairs of entities and/or may be stored in the matching preferences 140 to be applied in a next execution of the matching processes.

The user interface engine 120 may display other information in other embodiments, such as an attribute, and an associated score modifier, associated with a particular area of concern to the user. By way of example, after running the entity screening system, a user may discover that a client (e.g., a current or potential client) matches with only one public company and that the degree of matching is low. However, the matched public company may have a modifier indicating that it recently entered bankruptcy. The bankruptcy status modifier may not directly affect the match score or help determine whether the client and the public company are actually the same, but because strong financials may be an important consideration when deciding to work with a client, the user interface may display or alert the user to the bankruptcy status modifier.

Figure 2:
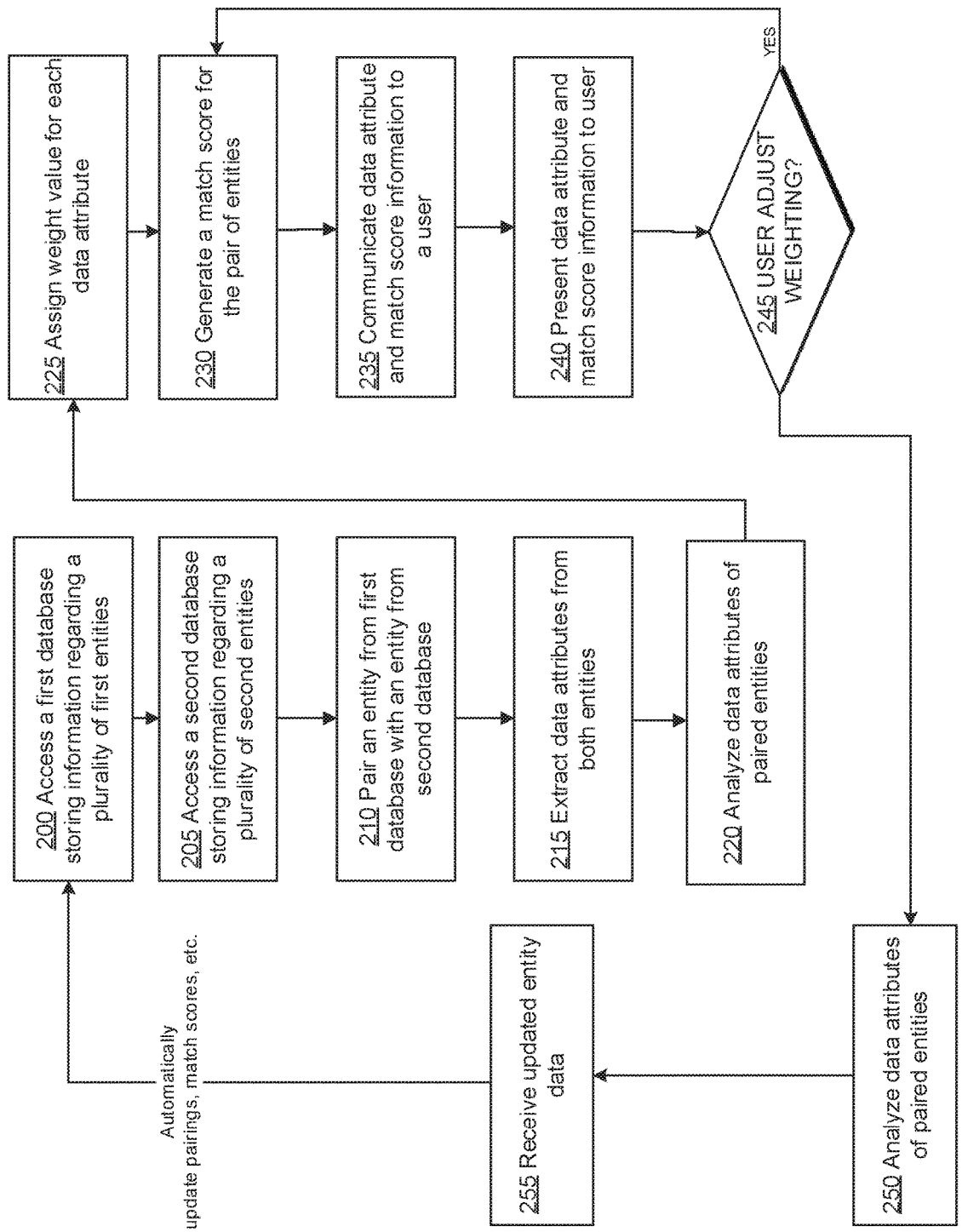
FIG. 2 is a process flow diagram of an example of a method to perform adaptive and transparent entity screening.

FIG. 2 is a flowchart illustrating one embodiment of a process of preforming adaptive and transparent entity screening. The process is described herein as performed by screening system 105 (e.g., by the various engines of the screening system 105), but certain blocks may be performed by other computing devices of the system. Depending on the embodiment, the method of FIG. 2 may include additional or fewer blocks and/or the blocks may be performed in an order different than is illustrated.

In the example of FIG. 2, the process begins at block 200 by accessing a first database storing information regarding a plurality of first entities. For example, a plurality of entity data records 150 associated with the screening system 105 may be accessed. In some embodiments, the entity data records 150 include information regarding entities which an organization has, is, and/or may have business dealings with. For example, the entity data records may include identity data regarding past, current, or potential clients, vendors, partners, affiliates, customers, etc. of the organization.

In block 205, the system 105 accesses a second database storing information regarding a plurality of second entities. For example, a plurality of comparison entity data records 170 may be accessed. In some embodiments, the comparison entity data records 170 include information regarding entities that may present an increased risk in business dealings. For example, the entity comparison entity data records 170 may include data regarding entities on a government-provided list of sanctioned entities, such as entities that have been sanctioned by the government, sanctions evaders, entities that have been subject to civil, criminal, tax, or other investigations, and/or any other list of entities that an organization would like to identify. While blocks 205 and 210 are illustrated as occurring sequentially in the example process presented in FIG. 2, the blocks may be performed partially or entirely simultaneously in other embodiments.

The process described in FIG. 2 continues to block 210 by pairing an entity from the first database with an entity from a second database for comparison. Once two entities have been paired together for comparison, the process proceeds by extracting data attributes from both entities and pairing similar data attributes together (e.g., the name of company 1 is paired with the name of company 2) in block 215.

With data attributes of paired entities identified, matching processes that compare and score particular attribute types may be executed at block 220. As noted above, the matching execution engine 110 may control operation of the various matching processes 140, such that matching of particular entity attributes may be performed at least partially in parallel, and certain matching processes may be executed more quickly, and possibly more frequently, than other matching processes. In some embodiments, the matching processes include weightings (e.g., system default, user defined, or machine-learning developed) that vary from one entity attribute to another, as indicated at block 225 of FIG. 2.

At block 230, another matching process generates an overall match score for the pair of entities, such as based on the weighted match scores of the various attribute matching processes executed on the entity pair. Weightings may be deliberately changed by a user or may automatically update in periodic intervals to reflect any changes in relevant data attributes. The overall match score may also be affected by a score modifier associated with various attributes. While score modifiers may not specifically indicate whether two entities are the same, they may increase visibility to entities associated with a higher risk attribute. For example, a score modifier may increase the overall match score by a static amount if an attribute of the entity being compared to comparison entities matches one or more criteria for score modification (e.g., where the criteria represents a particular area of concern). For example, a score modifier criteria may be that an entities address is within one of multiple countries, so that each entity within one of those countries starts off with a match score of the associated score monitor (plus additional scores associated with any particular attribute matches).

In one example, an overall match score for a pair of entities may represent a confidence level that the pair are a match (e.g., a match score of 0.20 may indicate a twenty percent likelihood that a client entity matches an entity on a sanctioned company list). However, the matched entity pair may be associated with an address in a country that is on a watch list of countries with corruption concerns and so a score modifier may be added to the match score to elevate it to a level where it will get attention by the organization. For example, a score modifier of 1.0 may be added to the overall match score of 0.20 to increase it to 1.2. In this example, the threshold for review of matches by a human operator may be set to 1.0; thus, a static score modifier of 1.0 necessarily elevates each matching pair to above that threshold (even if the score based on matching attributes is at a low confidence level) so that it is included in a list of entities to be further reviewed. In some embodiments, and for some score modifier criteria, the score modifier may be less than the threshold level that triggers review, such as 0.20 or 0.50 in the example above. In such embodiments, those score modifiers alone would not necessarily increase the match score to a level that triggers the match for further review, but the score modifiers contribute to a higher score that could reach the threshold level in combination with other attribute match scores. Accordingly, by altering the overall match score, score modifiers may draw attention to particular matches that a user may not otherwise have carefully scrutinized.

At block 235, the system 105 may communicate information regarding the matching process, such as individual matching data attributes and overall match score information for respective entity pairs to a user in block 235, such as via an interactive user interface generated by the user interface engine 120.

The information may be communicated to a remote computing device across a wireless a network, local area network, or a local computing device. However, in embodiments where the user plans to view the analysis on the same computing device where the analysis was performed, there may be no need to communicate the results across a network to a remote computing device. Once the data attribute and match score information has been communicated and received, the information may be presented to the user in block 240. The information may be presented to the user through a graphical user interface. The user may view the results and adjust weighting values for certain data attributes to better reflect the user's matching preferences in block 245. If the user decides to adjust any data attribute weighting, the process loops back to block 230 and generates a new match score for the pair of entities in real time based at least partly on the adjusted weightings. If the user does not manually adjust data attribute weightings, then the process continues to automatically and continuously analyze the paired entities in block 250. If a change or update to entity data is detected in block 255, the process loops back to block 200 sand accesses the appropriate database to extract updated entity data. As the process loops back to block 200, the process may automatically continue to the subsequent blocks to automatically update pairings, match scores, or data attributes to reflect updated entity data received in block 255.

Figure 3:
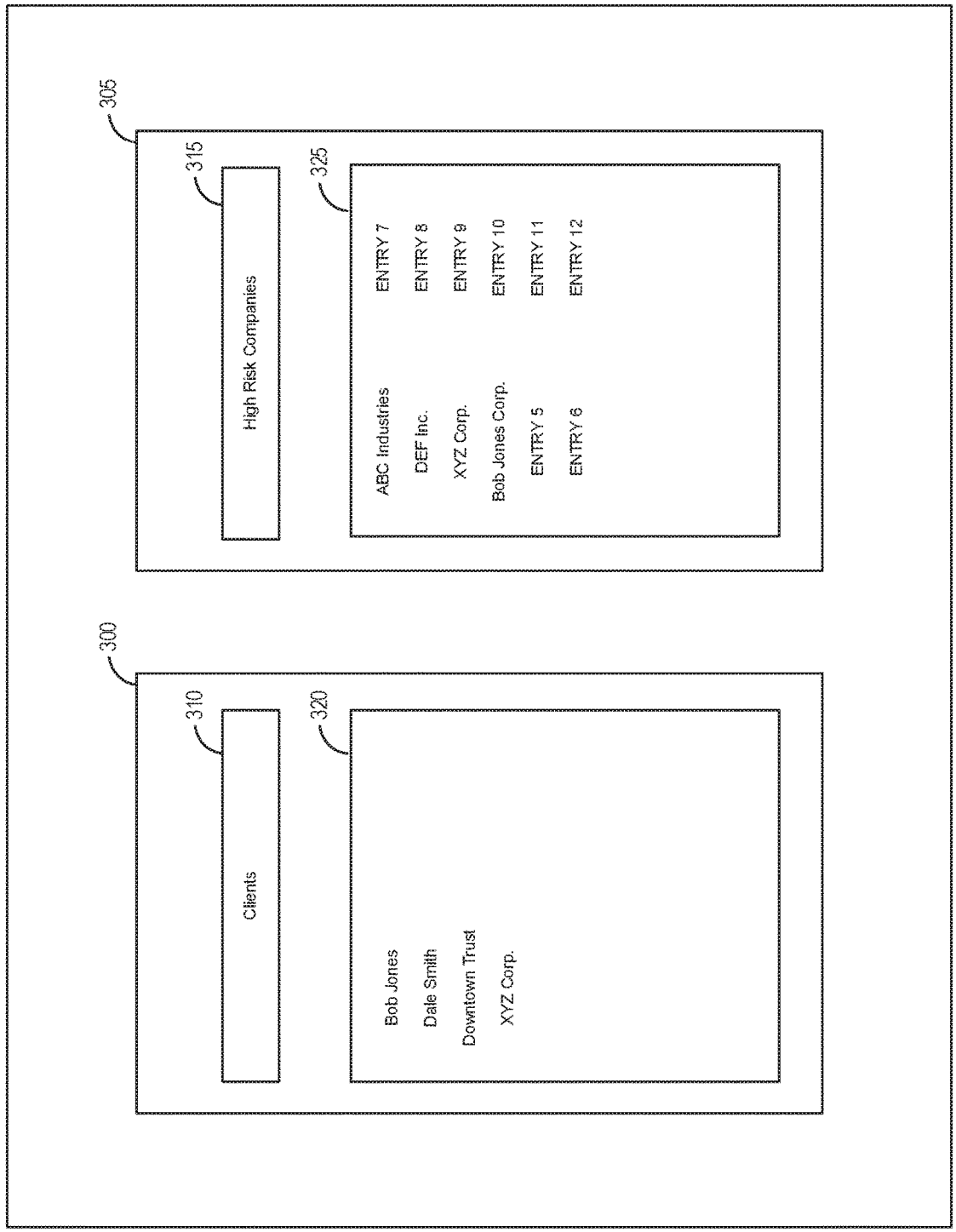
FIG. 3 illustrates an example of entity listings that may be used during adaptive and transparent entity screening.

FIG. 3 illustrates an example of databases used during adaptive and transparent entity screening. FIG. 3 illustrates a database 300 and a database 305. The database 300 is dedicated to storing entries relating to category 310. Entities that fit into category 310 are stored in entry list 320. In the particular example of FIG. 3, database 300 specifically stores a list of known clients while database 305 specifically stores a list of companies associated with a high risk of money laundering. The entries in list 320 and list 325 may be sorted in any particular order. For example, in some embodiments, the clients in list 320 may be listed alphabetically while the high risk companies in list 325 may be ordered according to annual net profit, where the first listed company has the highest gross revenue and the last entry has the lowest annual net profit.

Figure 4:
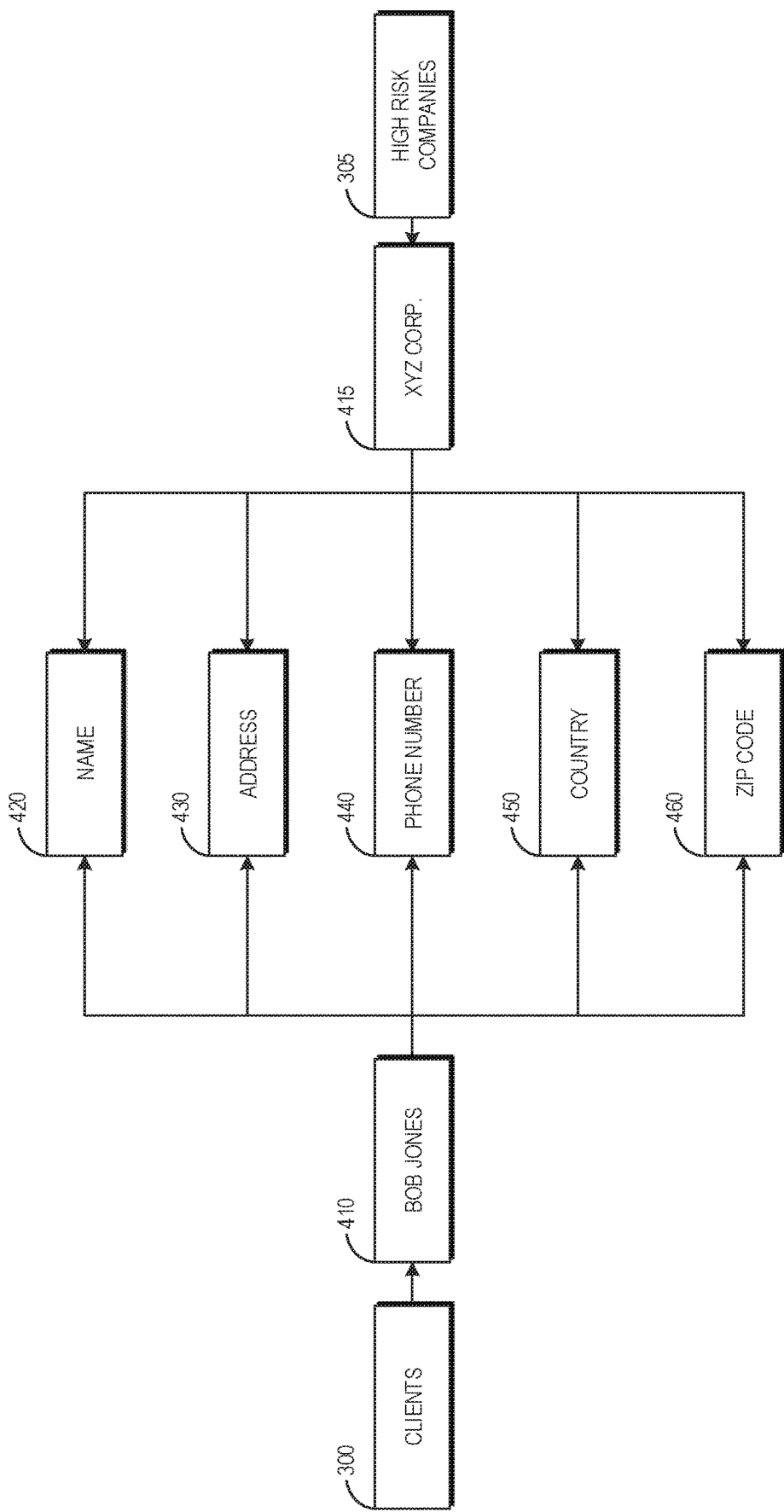
FIG. 4 illustrates an example of data attributes that may be used in pairing database entries during an entity screening process.

FIG. 4 illustrates an example of pairing entity attributes of a pair of entities from two entity lists. In the example presented by FIG. 4, the entity list 300 contains client records and a comparison entity list 305 contains a high risk company records. As previously discussed, the two lists may be stored in the entity data 150 of the screening system (FIG. 1) and/or in one or more comparison entity data stores 170 (FIG. 1).

In this example, each of the attribute pairs being tested for a match may be performed by a separate matching process. Furthermore, in some embodiments, and for some attributes, more than one matching algorithm may be executed with reference to the pair of attributes. For example, for a business name attribute, an exact match algorithm may first be executed and then, if a match is not found, a probabilistic matching algorithm (or multiple probabilistic matching algorithms in some embodiments) may be applied to the pair of business names. In such an embodiment, the match score may reflect the confidence level of the particular attribute match, for example by allocating a match score of x for an exact business name match, but only a match score of ½ x for a probabilistic business name match (or some other factor of x indicative of a confidence level of the probabilistic business name match).

In the example of FIG. 4, several example attributes 420-460 of each entity of an entity pair are associated with one another for application of one or more matching algorithms. For example, the matching execution engine 110 and/or one of the matching processes 130 (FIG. 1) may identify and tag (and/or extract) the various attributes from each of the entities on the entity lists. The attributes of the same type (e.g., name, address, phone number, country, ZIP Code, etc.) may then be paired for individual matching analyses. An example of FIG. 4, the name associated with Bob Jones is paired with the name associated with XYZ Corporation in a pair 420. An address associated with Bob Jones is paired with an address associated with XYZ Corporation in pair 430. A phone number associated with Bob Jones is paired with a phone number associated with XYZ Corporation in a pair 440. A country associated with Bob Jones is paired with a country associated with XYZ Corporation in a pair 450. A zip code associated with Bob Jones is paired with a zip code associated with XYZ Corporation in a pair 460. While the specific example in FIG. 4 presents the pairing of five different data attributes, any number of data attributes may be paired together in other embodiments.

With the paired attributes identified, one or more matching processes (e.g., matching algorithms) may be applied to each of the paired attributes. For example, a name matching process 130 may access and compare the entity name attribute 410, Bob Jones, from the entity list 300 and then entity name attribute 415, XYZ Corporation, from the comparison entity list 305, such as based on one or more deterministic or matching algorithms (each with a different associated match score). An address matching process 130 may then access and compare address attributes of Bob Jones and XYZ Corporation, again using one or more matching algorithms that may each be associated with different score values (or "weightings") that are added to an overall match score when the algorithm identifies a match. Comparison of the other attributes may be performed in a similar manner.

Example User Interface

Advantageously, the system 100 may allow users to interact and analyze electronic data in a more analytically useful way. Graphical user interfaces allow the user to visualize otherwise obscure relationships and patterns between different data objects. The present disclosure allows for greater transparency and accuracy by allowing a user to understand the results of an entity screening and tailor entity screening to his or her specific needs.

Figure 5:
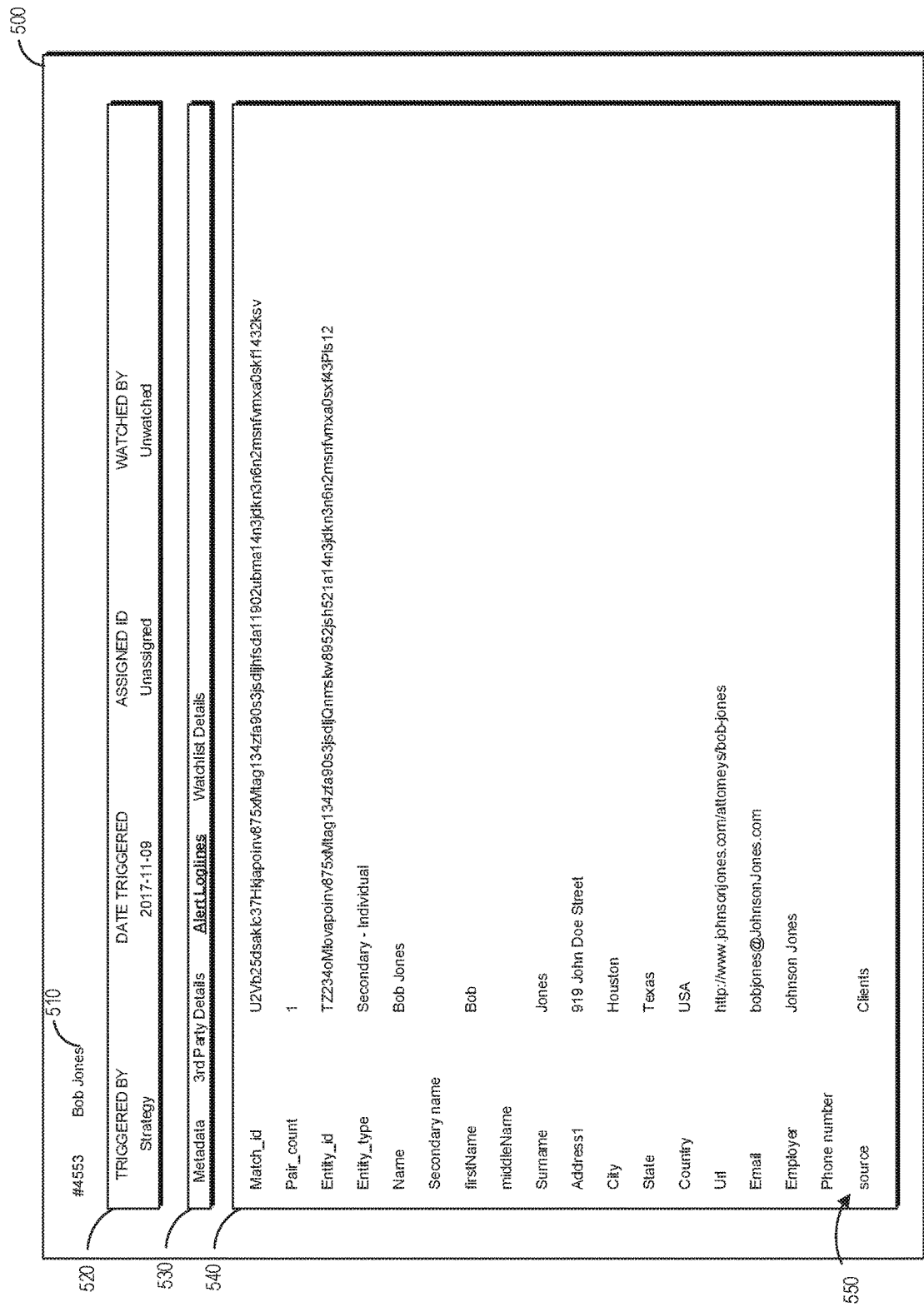
FIG. 5 illustrates an example of a user interface displaying entity screening information.

FIG. 5 illustrates an example of a user interface displaying to a user information relating to an entity. The user interface engine 120 from FIG. 1 may display information about a particular entity to a user. In the specific example presented in FIG. 5, a user interface 500 shows information about Bob Jones. The user interface 500 may include a header 510 displaying the name of the entity. The user interface 500 may also include a table 520 displaying information related to the results of a previous screening. For example, the table 520 shows that a match alert triggered for Bob Jones on Nov. 9, 2017. The user interface 500 may also include a category bar 530 so that the user may choose what information to view in the display. Though the category bar 530 in FIG. 5 displays four categories (Metadata, 3rd Party Details, Alert Loglines, and Watchlist Details), the category bar 530 may display any number of categories in alternate embodiments. Based on the category chosen in the category bar 530, the user interface 500 may present the relevant information about Bob Jones in a data field 540. Here in FIG. 5, the data field 540 includes basic information about Bob Jones, such as, e.g., his legal name, address information, and employer. Additionally, the data field 540 may also note the source of the displayed information, such as the comparison entity data to which Bob Jones was matched. As shown in entry 550, the information gathered about Bob Jones is based on data extracted from the Clients database 300 from FIG. 3.

Figure 6:
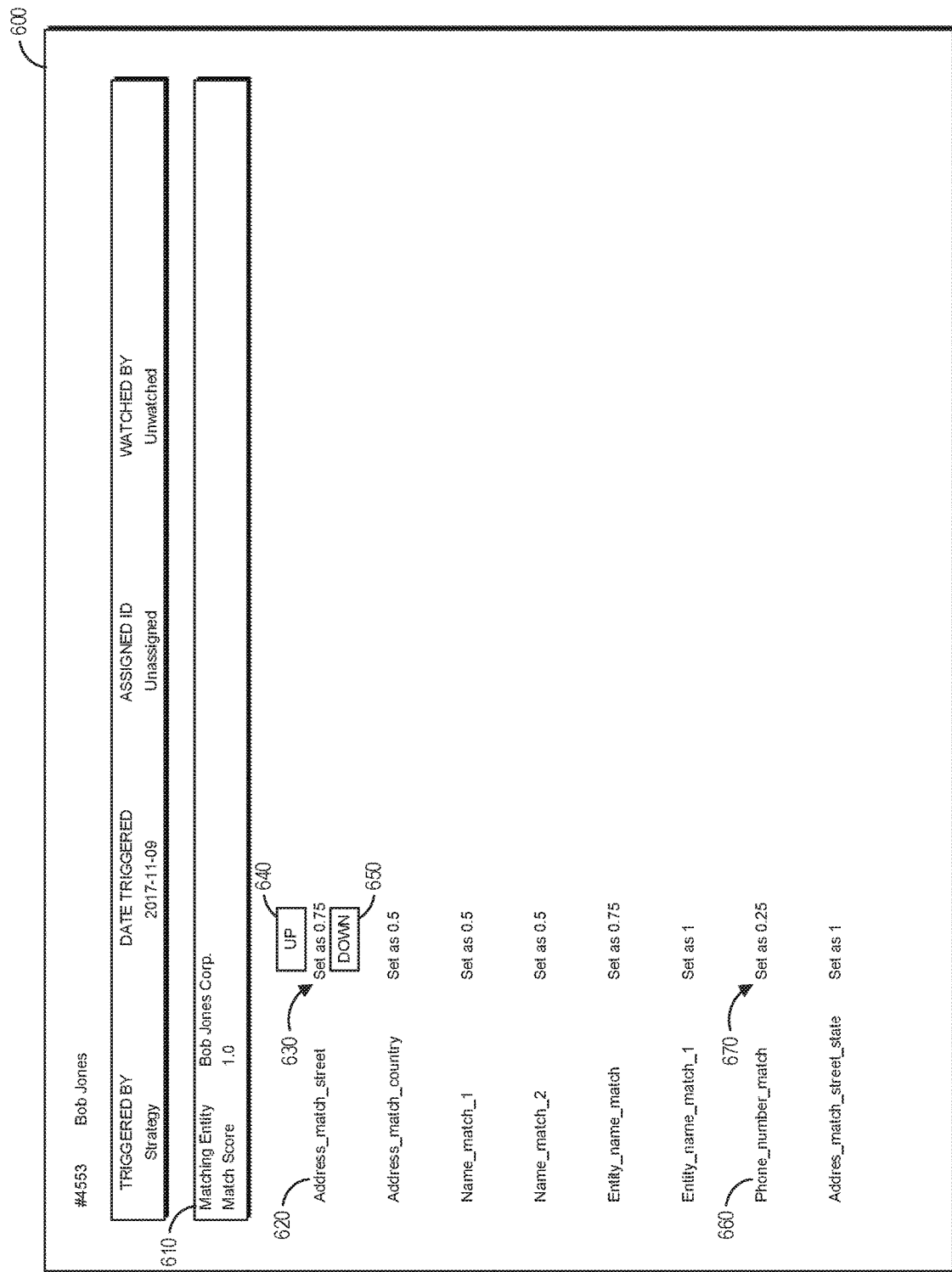
FIG. 6 illustrates an example of a user interface displaying matching processes and corresponding attribute match scores.

FIG. 6 illustrates an example of a user interface displaying to a user an example of results from adaptive and transparent entity screening. To promote transparency in entity screening, a user interface 600 may display how closely one entity matches with another entity in a table 610. In the example presented by FIG. 6, the table 610 shows that Bob Jones (e.g., an entity in a vendor list of an organization) is matched with another entity called Bob Jones Corp. (e.g., an entity in a sanctioned entity comparison list) with an overall match score of 1.0. Advantageously, the user interface 600 may also display a weighting (or individual attribute match score contribution) 630 associated with the address_match_street matching process, and similarly displays the weighting of other particular attribute matching process. As shown, the weightings of the various match processes may not be equal and, in some embodiments, may be a function of a confidence level output of a particular matching process. In the example of FIG. 6, the address_match_street process 620 is set to contribute a match score of 0.75 to entity pairs where the addresses are found to be a match. With reference to the example above, if the address_match_street algorithm determines that the street addresses of Bob Jones and Bob Jones Corp. are a match, then a match score contribution of 0.75 is added to an overall match score. However, if the phone numbers of Bob Jones and Bob Jones Corp. match according to a phone_number_match process 660, a match score contribution 670 of only 0.25 is added to the overall match score. Therefore, in this example, a match of street address attributes impacts the overall match score more heavily than a match of phone number attributes.

In the example of FIG. 6, the user may alter the match score contributions (also referred to a weightings) of matches identified by particular match processes. For example, the user interface 600 may show a button 640 to increase the weighting of the address_match_street process and a button 650 to decrease the weighting of the address_match_street process. In some implementations, a user (e.g., a system administrator, compliance officer, etc.) may determine over time that an exact street address match (e.g., based on the address_match_street process) is not as probative in determining overall entity match scores for a particular entity screening project and, thus, the user may press the button 650 to decrease the weighting associated with the address_match_street attribute 620 to a lower level. Conversely, if user determines that the exact street match is even more probative in the entity screening project, the user may press the button 640 to increase the weighting associated with the address_match_street attribute 620. In some embodiments, the system may be configured to automatically re-execute a match process against each pair of entities in the various entity lists in response to adjustment of the weighting of the associated match process.

Figure 7:
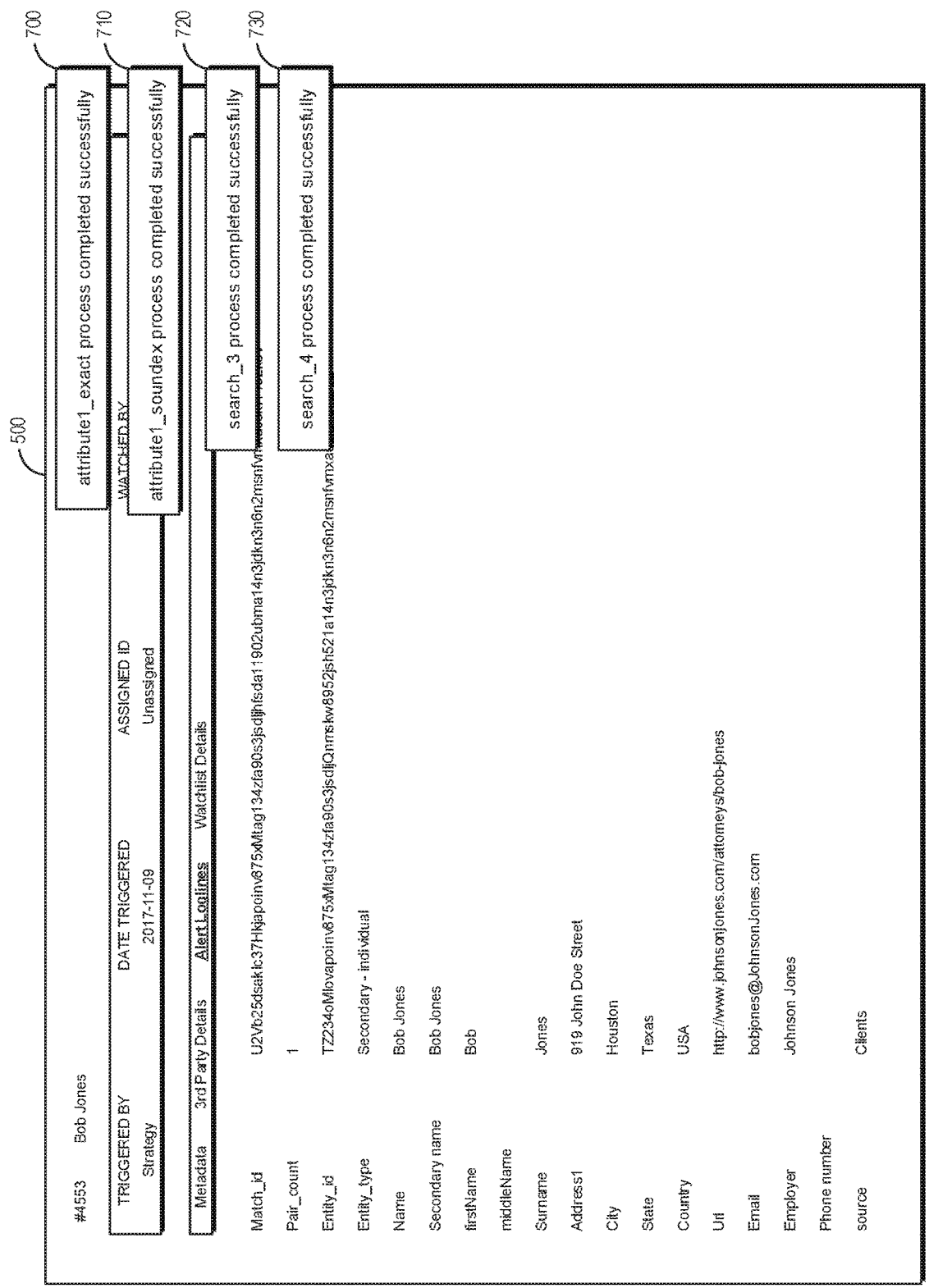
FIG. 7 illustrates an example user interface including alerts regarding various entity matching processes being performed in the background.

FIG. 7 illustrates an example user interface including alerts regarding various entity matching processes being performed in the background. In the example presented by FIG. 7, a user may be browsing the information displayed on user interface 500 as previously shown in FIG. 5. While the user browses the page, a notification 700 appears to alert the user that a matching process (e.g., attribute1_exact match process, which may apply an exact match algorithm to each pair of entity attributes) has completed in the background, indicating that overall match scores of the entities may be modified in view of the freshly executed match process. In this embodiment, multiple processes (e.g., each applying different matching algorithms, weightings, etc. to different subsets of one or more attributes of entity pairs) may continue to operate in the background in real time while the user performs other functions or even leaves the computing system "idle", so the example notifications 710, 720, and 730 may also appear in the user interface 500 to alert the user when the processes complete.

In some embodiments, alert rules may be set to provide immediate notifications of changes in match scores, such as when an overall match score for a particular entity pair has increased from a prior calculated overall match score (or has increased by at least a predetermined amount). As the system continually recalculates contributions to overall match scores of entity pairs, and the resultant overall match scores of the entity pairs, alert rules may be applied to allow a user to be notified of changes of interest. Alerts may be delivered in any form, such as pop-ups within the entity screening software, system level pop-ups/alerts, emails, text messages, etc.

In some embodiments, alerts and/or notifications are automatically transmitted to a user's device in response to a corresponding notification rule. The alert and/or notification can be transmitted at the time that the alert and/or notification is generated or at some determined time after generation of the alert and/or notification. When received by the user device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Figure 8:
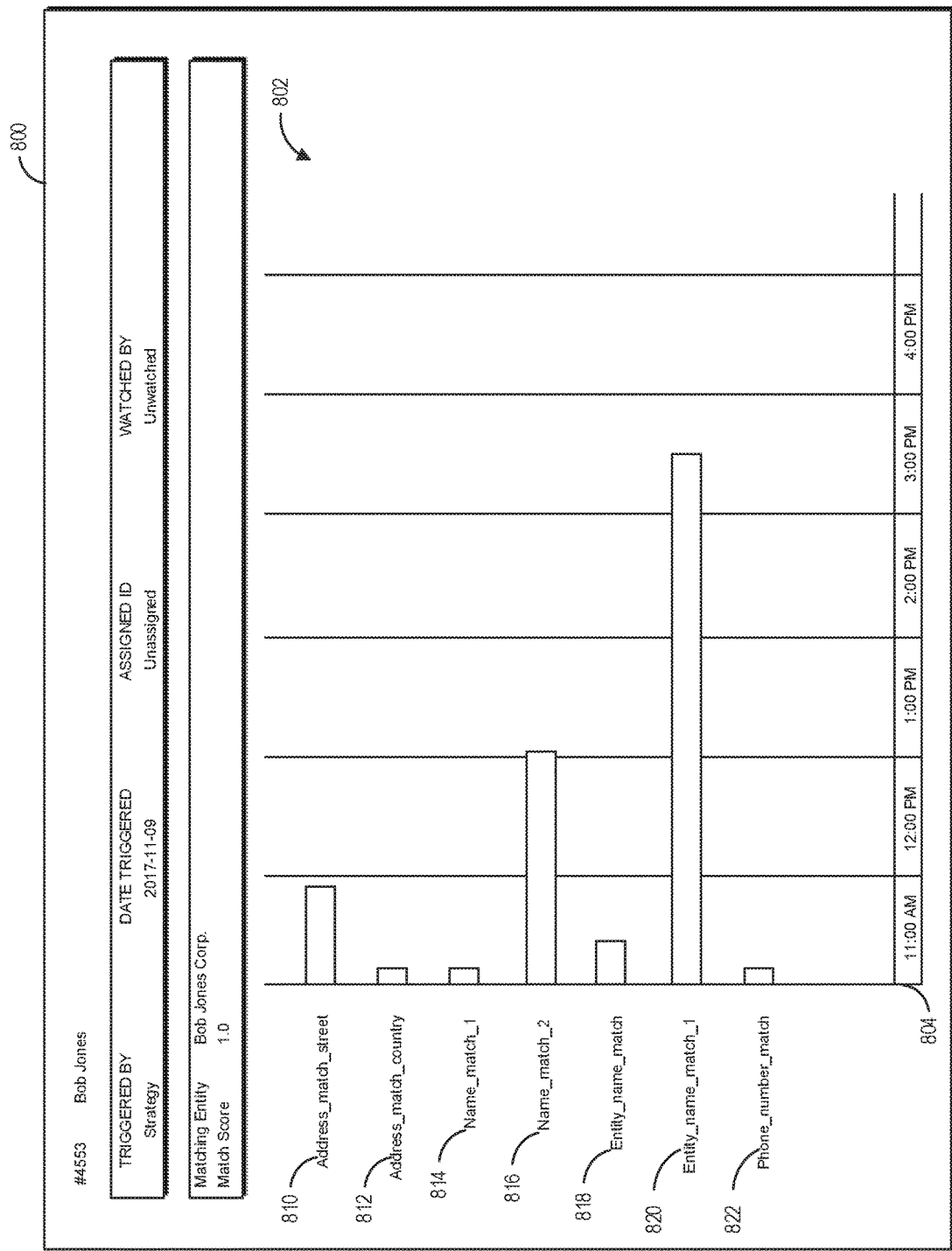
FIG. 8 illustrates an example of a user interface displaying multiple processes running in parallel in the adaptive and transparent entity screening.

FIG. 8 illustrates an example of a user interface displaying information regarding multiple processes that have executed (and/or are currently executing) in parallel in the adaptive and transparent entity screening system. Advantageously, the screening system may run multiple processes concurrently and display progress to the user. In the specific example of FIG. 8, a user interface 800 displays the run time of the processes 810, 812, 814, 816, 818, 820, and 822 as a graph 802. The graph 802 includes an x-axis 804 tracking the time from the beginning of a process until completion. The example processes in FIG. 8 simultaneously begin execution at 11:00 AM. However, the processes complete at different times of the day. By way of example, the address_match_street process 810 finishes executing within one hour after starting while the name_match_2 process 816 takes close to two hours to complete. In some embodiments, execution of the various match processes is controlled (e.g., re-executed) based on instructions from the matching execution engine 110. For example, the matching execution engine may be configured to re-execute a match process immediately (or after some predefined time delay) after its completion, such that those match processes that complete more quickly are executed more frequently. Alternatively, the matching execution engine may have a schedule for re-execution of various matching processes, which may be configured to ensure that each matching process is completed at least once (and perhaps no more than a predetermined threshold) within a certain time period (e.g., 12 hours, one day, one week, etc.) Though the example presented in FIG. 8 visually represents the run time of the example processes as a bar graph, other embodiments may visually represent concurrent execution and run time differently. Like in FIG. 7, the user interface in FIG. 8 may be accessed via a webpage, an application, dedicated software, etc.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages.

Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
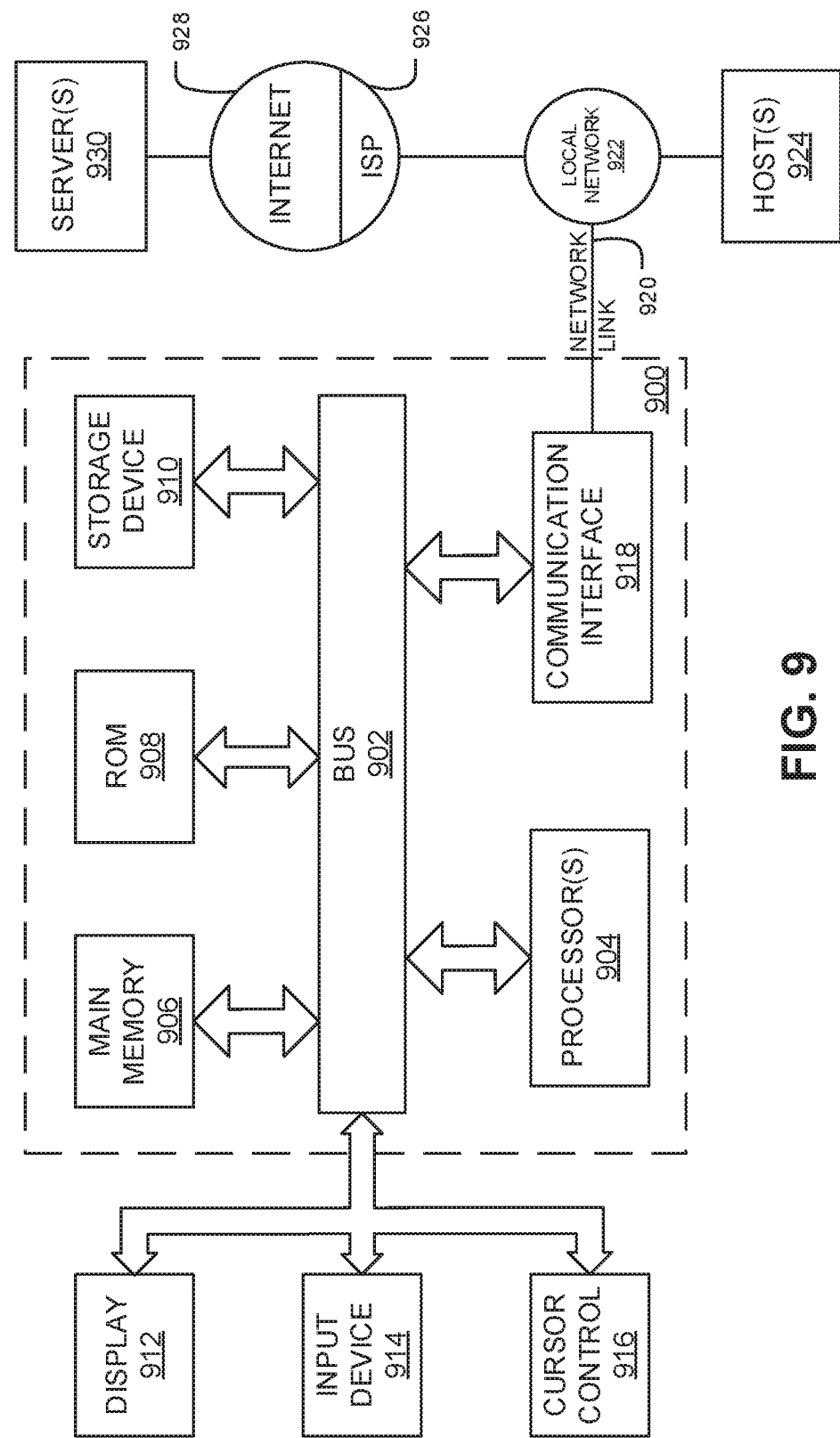
FIG. 9 is a block diagram of an example computing system configured to perform adaptive and transparent entity screening.

For example, FIG. 9 is a block diagram that illustrates a computer system 900 upon which various embodiments may be implemented. Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicate with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
one or more computer processors; and
a tangible computer readable medium storing software instructions executable by the one or more computer processors to cause the computing system to:
access a first entity list comprising a plurality of first entity records, each of the first entity records comprising a plurality of first attributes;
access a second entity list comprising a second plurality of second entity records, each of the second entity records comprising a plurality of second attributes;
determine pairs of entities each comprising a first entity of the first entity records and one of the second entities of the second entity records; and
for each determined pair of entities:
apply one or more matching rules to attributes of the pair of entities to determine a plurality of attribute specific match scores associated with the determined pair of entities; wherein each attribute specific match score is associated with a specific attribute of the first entity and a corresponding specific attribute of the second entity; and
generate an overall pair match score for each of the determined pairs of entities by combining the plurality of attribute specific match scores for the determined pair of entities, wherein the overall pair match score represents a strength of a match between the first and the second entity.

2. The computing system of claim 1, wherein the software instructions are further configured to cause the computing system to:
provide a user interface including at least some of the pairs of entities based on overall pair match scores.

3. The computing system of claim 1, wherein the software instructions are further configured to cause the computing system to:
periodically automatically determine changes in overall pair match scores.

4. The computing system of claim 3, wherein the periodically automatically determining changes in overall pair match scores comprises:
accessing the first and second entity lists, including any updates to the first and second plurality of entities;
determining updated pairs of entities and applying the matching rules to each of the updated pairs to generate updated overall pair match scores; and
determining changes in overall pair match scores compared to previously generated overall match scores of the updated pair of entities.

5. The computing system of claim 1, wherein a first matching rule comprises a matching algorithm determining a number of deletions, insertions, or substitutions required to transform a first string to a second string and a second matching rule comprises a matching algorithm encoding homophones to match strings with similar pronunciations despite minor differences in spelling, and a third matching rule comprises an exact matching algorithm.

6. The computing system of claim 1, wherein a first and second matching rules are each associated with a first entity identifying attribute, the first matching rule comprising a deterministic matching algorithm and the second matching rule comprising a probabilistic matching algorithm.

7. The computing system of claim 6, wherein the attribute specific match score associated with the first matching rule is larger than the attribute specific match score associated with the second matching rule.

8. The computing system of claim 7, wherein the second matching rule is executed only in response to an output of the first matching rule indicating that the first entity identifying attributes are not an exact match.

9. The computing system of claim 2, wherein the software instructions are further executable to cause the computing system to:
determine one or more of the overall pair match scores that exceed an alert threshold; and
update the user interface to include an indication of the determined one or more overall pair match scores.

10. The computing system of claim 2, wherein the user interface includes controls enabling adjustment of attribute specific match scores of respective matching rules.

11. The computing system of claim 1, wherein the software instructions are further configured to cause the computing system to:
apply a score modifier criteria to one or more entity identifying attributes; and
if the score modifier criteria is met by the one or more entity identifying attributes, increase the overall pair match score by a score modifier.

12. The computing system of claim 11, wherein the score modifier criteria indicates one or more particular geographic regions.

13. The computing system of claim 12, wherein application of the score modifier is performed on each pair of entities having an overall match scores above a predetermined threshold.

14. The computing system of claim 13, wherein the predetermined threshold is zero.

15. The computing system of claim 12, wherein the score modifier is larger than an alert threshold.

16. The computing system of claim 2, wherein the user interface indicates the attribute specific match scores for each of the matching rules and includes user interface controls configured to receive user input causing adjustments to the attribute specific match scores.

17. The computing system of claim 2, wherein the user interface displays pairs of entities having highest overall pair match scores.

18. The computing system of claim 2, wherein the user interface further displays a score modifier associated with a particular entity identifying attribute, wherein the score modifier alters the overall match score of entity pairs matching a corresponding score modifier criteria.

19. The computing system of claim 3, wherein periodically automatically comprises in real time, once every few hours, once a day, or other time intervals.

20. A method performed by one or more computer processors by executing software instructions stored in a tangible computer readable medium, the method comprising:
- accessing a first entity list comprising a plurality of first entity records, each of the first entity records comprising a plurality of first attributes;
- accessing a second entity list comprising a second plurality of second entity records, each of the second entity records comprising a plurality of second attributes;
- determining pairs of entities each comprising a first entity of the first entity records and one of the second entities of the second entity records; and
- for each determined pair of entities:
  - applying one or more matching rules to attributes of the pair of entities to determine a plurality of attribute specific match scores associated with the determined pair of entities; wherein each attribute specific match score is associated with a specific attribute of the first entity and a corresponding specific attribute of the second entity; and
  - generating an overall pair match score for each of the determined pairs of entities by combining the plurality of attribute specific match scores for the determined pair of entities, wherein the overall pair match score represents a strength of a match between the first and the second entity.

* * * * *